Aug. 12, 1958   H. N. QUOSS   2,846,736
COMBINED THRESHOLD AND DOOR-BOTTOM SEAL
Filed Oct. 8, 1956
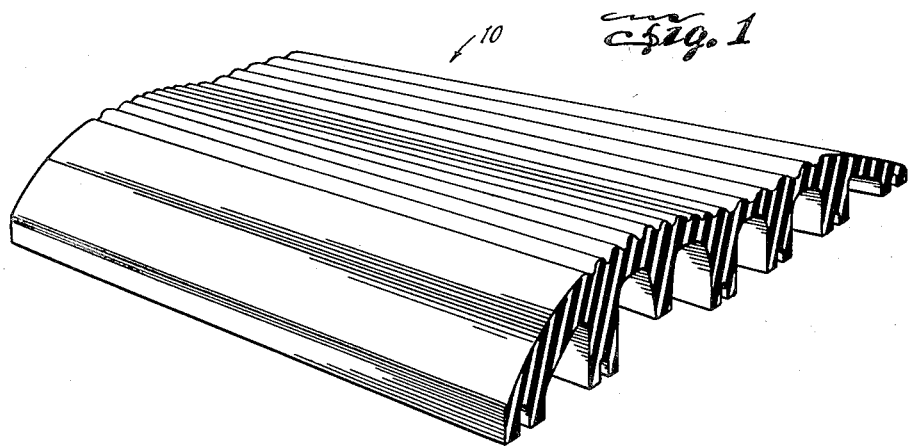
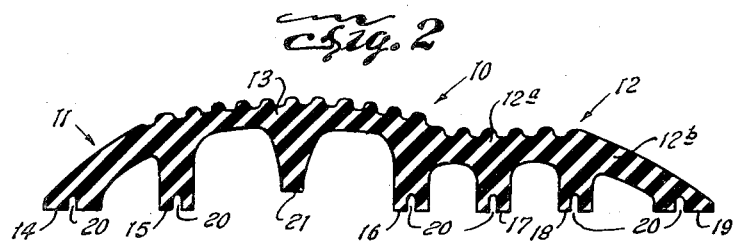
Henry N. Quoss
INVENTOR.
BY Ernest A. Wood
ATTORNEY

United States Patent Office 2,846,736
Patented Aug. 12, 1958

2,846,736

COMBINED THRESHOLD AND DOOR-BOTTOM SEAL

Henry N. Quoss, Dallas, Tex.

Application October 8, 1956, Serial No. 614,681

6 Claims. (Cl. 20—64)

This invention relates to thresholds, more particularly to thresholds having means for closing the space under closed doors against drafts and weather.

One object of this invention is to provide a new and improved threshold incorporating sealing means whereby the space between a closed door and threshold is sealed against drafts and also weather in the case of an outside door.

Another object is to provide a threshold and sealing means made in one piece which can be readily secured to the floor or sill by any suitable means such as by the use of an adhesive or by screws or nailing.

And another object is to provide a combination threshold and seal which is adjustable for variations in the space between the door bottom and the sill or threshold.

Still another object is to provide sealing means with a supporting member beneath it to limit its depression substantially to the threshold level when stepped upon.

Other objects will appear as the description proceeds, when considered in connection with the accompanying drawing wherein:

Fig. 1 is a perspective view of a short piece of the threshold invention as formed, molded, or extruded in one piece.

Fig. 2 is a cross-section taken in a plane at right angle to the principle axis of the threshold.

Continuing now with a detailed description of the invention, reference numeral 10, Fig. 1, of the drawing, designates the threshold invention generally, which has the threshold portions 11 and 12, respectively, with the sealing portion 13 bridged between them. The portion 12 has the platform 12a, as well as bevel 12b, but the platform can be omitted where a more narrow threshold is necessary or desirable. Both the said platform 12a and the sealing portion 13 are provided with safety treads of any conventional pattern.

The threshold has its edges 14, 19, respectively, formed to engage the floor or sill upon which the threshold rests. Two floor or sill engaging supports 15, 16, extend downwardly from the underside of the threshold substantially along the lines where the sealing portion 13, joins the said threshold portions 11, 12 at each side. One or more floor or sill engaging supports 17, 18, are provided beneath the portion 12, depending upon the width of said platform. An extension 21, is provided on the underside of said sealing portion, substantially along its principle center-line, arranged to engage the floor or sill upon which the threshold is mounted, when said sealing portion is depressed, substantially level with the threshold portions. Each of the floor or sill engaging supports of the threshold is provided with a groove 20, which promotes adhesion of same to the floor or sill as the case may be. Obviously, nails or screws can be used in place of an adhesive.

The sealing portion 13 is made thin enough so that it will readily curve or arch upwardly when the threshold portions 11, 12, are moved toward each other. This enables one to fit the sealing portion snugly up against the bottom of doors which may have been cut too short or unevenly. It also permits fitting the sealing portion snugly where door-bottoms are not parallel with the floor or sill, due to settling or improper cutting. New doors, of course, are cut to size so as to fit upon the sealing portion properly when the door is closed, but here too the adjustable feature is available to make a snug fit. The threshold is aligned properly and the bevel 11 is fastened upon the floor or sill. Then the portion 12, is moved towards the door until the sealing portion fits snugly against the door-bottom, where upon it is secured to the floor or sill. This concludes the description of the invention.

It will be apparent to those skilled in the art that various changes and modifications can be made in the form illustrated and described herein, without departing from the invention, and it is intended that the specifications and appended claims include such modifications as fall within the spirit and scope of the invention.

What is claimed is:

1. A combined threshold and door-bottom seal for mounting on a floor under a door, formed in one continuous piece of a resilient material, consisting of two threshold portions and a sealing portion bridged between them; said sealing portion being made thin enough to bulge upwardly to contact the bottom end of a closed door when one of said threshold portions is moved toward the other said threshold portion before securing the threshold portions to said floor, floor engaging supports extending downwardly from the under side substantially along each of the lines defining the joining of said sealing portion at each of its sides with said threshold portions; and floor engaging surfaces formed on the under side of the edges of said threshold portions.

2. The structure described in claim 1, wherein said bridged sealing portion is made in the form of a depressible arch rising above said threshold portions.

3. A combined threshold and door-bottom seal for mounting on a floor under a door, formed of resilient material in one continuous piece consisting of two threshold portions and a sealing portion between them; said sealing portion being made in the shape of a depressible arch rising higher than said threshold portions; floor engaging supports extending downwardly from the underside substantially along lines defining the meeting of said sealing portion with said threshold portions, at each side; said sealing portion being made thin enough to bulge upwardly above its normal height to contact the bottom of doors too short to normally contact said sealing portion, when one of said threshold portions is moved toward the other said threshold portion, before securing the threshold portions to said floor; a central extension mounted on the under side of said sealing portion arranged to engage the said floor to support said sealing portion when said sealing portion is depressed substantially to the level of the top of the threshold portions; and floor engaging surfaces formed on the under side of the edges of said threshold portions.

4. A combined threshold and door bottom seal for mounting on a floor under a door, formed in one continuous piece of a resilient material, consisting of two threshold portions and a sealing portion bridged between them, the sealing portion being made thin enough to bulge upwardly to contact the bottom end of a closed door when one of the threshold portions is moved toward the other threshold portion before securing the threshold portions to the floor, floor engaging supports extending downwardly from the under side substantially along each of the lines defining the joining of the sealing portion at each of its sides with the threshold portions, and floor engaging surfaces formed on the under side of the edges of the threshold portions, the bridged sealing portion being made in the form of a depressible arch rising above the threshold portions, and a central extension being provided on the under side of the sealing portion arranged to engage the floor to support the sealing portion when the sealing portion is depressed substantially to the level of the top of the threshold.

5. A combined threshold and door bottom seal for mounting on a floor under a door, formed in one continuous piece of a resilient material, consisting of two threshold portions and a sealing portion bridged between them, the sealing portion being made thin enough to bulge upwardly to contact the bottom end of a closed door when one of the threshold portions is moved toward the other threshold portion before securing the threshold portions to the floor, floor engaging supports extending downwardly from the under side substantially along each of the lines defining the joining of the sealing portion at each of its sides with the threshold portions, and floor engaging surfaces formed on the under side of the edges of the threshold portions, the bridged sealing portion being made in the form of a depressible arch rising above the threshold portions, a central extension being provided on the under side of the sealing portion arranged to engage the floor to support the sealing portion when the sealing portion is depressed substantially to the level of the top of the threshold, and a platform portion being included between the sealing portion and the threshold portion along one side of the sealing portion.

6. The structure described in claim 5, wherein a floor engaging support is provided extending downwardly from the under side of the platform.

References Cited in the file of this patent
UNITED STATES PATENTS

| | | |
|---|---|---|
| 588,626 | Baumann | Aug. 24, 1897 |
| 1,700,152 | Beck | Jan. 29, 1929 |